United States Patent [19]

Knop et al.

[11] Patent Number: 4,976,611

[45] Date of Patent: Dec. 11, 1990

[54] METHOD AND APPARATUS FOR THE THERMAL TREATMENT OF WASTE MATERIALS

[75] Inventors: Klaus Knop, Geldern; Günter Wolters, Duesseldorf, both of Fed. Rep. of Germany

[73] Assignee: MAN Gutehoffnungshutte, Fed. Rep. of Germany

[21] Appl. No.: 416,389

[22] Filed: Oct. 2, 1989

[30] Foreign Application Priority Data

Oct. 1, 1988 [DE] Fed. Rep. of Germany ....... 3833457

[51] Int. Cl.$^5$ ............................................. F27D 17/00
[52] U.S. Cl. .................... 432/181; 432/182; 432/216
[58] Field of Search ................. 432/181, 182, 223, 30; 110/216

[56] References Cited

U.S. PATENT DOCUMENTS

| | | | |
|---|---|---|---|
| 1,739,973 | 12/1929 | Mambourg | 432/181 |
| 3,870,474 | 3/1975 | Houston | 432/181 |
| 4,375,236 | 3/1983 | Tsai | 432/181 |
| 4,394,122 | 7/1983 | Bueno et al. | 432/30 |
| 4,528,012 | 7/1985 | Sturgill | 432/182 |
| 4,540,361 | 9/1985 | Gagne | 432/181 |
| 4,579,069 | 4/1986 | Gay et al. | 110/216 |
| 4,757,770 | 7/1988 | Lisowyj et al. | 110/216 |
| 4,796,545 | 1/1989 | Hashizaki et al. | 110/216 |

Primary Examiner—Henry C. Yuen
Attorney, Agent, or Firm—McGlew & Tuttle

[57] ABSTRACT

In a method for the thermal treatment of wastes (combustible, poorly combustible and incombustible), especially those which cannot be harmlessly dumped, air is preheated in a first regenerator (2) to a temperature of 800° to 1200° C. and fed through a first combustion chamber (7) to a melting vessel (6) into which wastes are dumped for thermal treatment. The flue gas from the melting vessel is fed through a second combustion chamber (7') to a second regenerator (2'). The two regenerators contain sections for thermal storage (3, 3'), for the adsorption (4, 4') of flue gas impurities and for the further treatment (5, 5') of the flue gas. The air and flue gas flow is reversible, i.e., air preheated in the second regenerator (2') is fed to the melting vessel (6) through the second combustion chamber (7'). The flue gas is fed through the first combustion chamber (7) to the first regenerator (2).

11 Claims, 2 Drawing Sheets

METHOD AND APPARATUS FOR THE THERMAL TREATMENT OF WASTE MATERIALS

FIELD OF THE INVENTION

The invention relates to a method for the thermal treatment of wastes, especially wastes which cannot be safely dumped and which are combustible, poorly combustible or incombustible.

BACKGROUND OF THE INVENTION

The environmentally conscientious disposal of special wastes which cannot be simply dumped, and which are incombustible or poorly combustible, calls for the thermal treatment of these materials at high temperatures.

If the wastes have only a low heat value or are not at all combustible, the addition of fuels is necessary, to make the "combustion" (thermal degradation) of the waste material that is to be treated at all possible.

Usually the waste is put into a rotary kiln and, with the addition of fuel and air, is thermally processed (burned) such that the remaining slag can be safely dumped. The exhaust gases produced by the combustion are cooled in appropriate flue gas units to produce steam. Dust and other impurities ($SO_2$ etc.) are removed from the flue gas in scrubbers or flue gas washing apparatus connected to the exhaust.

This kind of waste elimination is energy intensive and costly, especially as regards the exhaust gas washing or scrubbing. Furthermore, the known methods depend on the production of steam in order to make economical use of the waste heat from the rotary kiln and the afterburning chamber.

SUMMARY AND OBJECTS OF THE INVENTION

It is an object of the invention to provide a thermal treatment method and an apparatus for the practice of such method, in which an environmentally safe elimination of waste substances will be made possible with a minimum expenditure of energy and money.

According to the invention, a method for thermal treatment of wastes which are combustible, poorly combustible or incombustible is provided. The method is especially useful for wastes that cannot safely be dumped. The method includes preheating air to a temperature of 800° to 1200° C. like in a first regenerator. The preheated air is then fed to a first combustion chamber where heated gases are generated and pass with the air to a melting vessel to generate flue gas. The wastes are deposited in the melting vessel such that they may be thermally treated by the hot gases. Flue gas from the melting vessel is then fed to a second combustion chamber and then fed to a second regenerator. Each of the first and second regenerators is provided with section for thermal storage, a section for adsorption of impurities, contained in the flue gas, and a section for further treatment of the flue gas.

The apparatus according to the invention includes the melting vessel with a controlled waste feed and a slag outlet and first and second regenerator means. Each regenerator means includes an air inlet and an air/gas outlet. The regenerator means are for a preheating of air and for cleaning flue gas leaving the melting vessel. Between each regenerator means and the melting vessel there is provided a combustion chamber which ensures that flue gas leaving the melting vessel does not vary above or below a given temperature range. The combustion chamber may be varied via a fuel feed control valve. Advantageously, a connection arrangement including a connection and blower means is provided establishing air and flue gas flow in a first direction from the first regenerator means through the first combustion chamber, through the melting vessel, through the second combustion chamber to the second regenerator means and for establishing air and flue gas flow in a second direction from the second regenerator means through the second combustion chamber, through the melting vessel, through the first combustion means to the first regenerator means. Advantageously, the regenerator means may be provided as a single unit including a thermal storage section, a section for the adsorption of impurities contained in the flue gas and a section for further treatment of the flue gas or with each of the sections as separate units.

In the metal producing industry processes are known (Siemens-Martin furnaces) in which, for example, the waste heat from flue gases serve to heat thermal storage masses (regenerators) and the stored heat is transferred back to the process later on. In the method of the invention aspects of the thermal storage method known from steelmaking processes are employed. A novel feature of the method of the invention includes applying this principle equally to the thermal treatment of combustible, poorly combustible and incombustible waste substances which cannot be harmlessly dumped, and that the regenerators perform as flue gas cleaning apparatus in addition to their role as thermal transfer means.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

DETAILED DESCRIPTION OF THE PREFERRED EMBODIMENT

Figure 2:
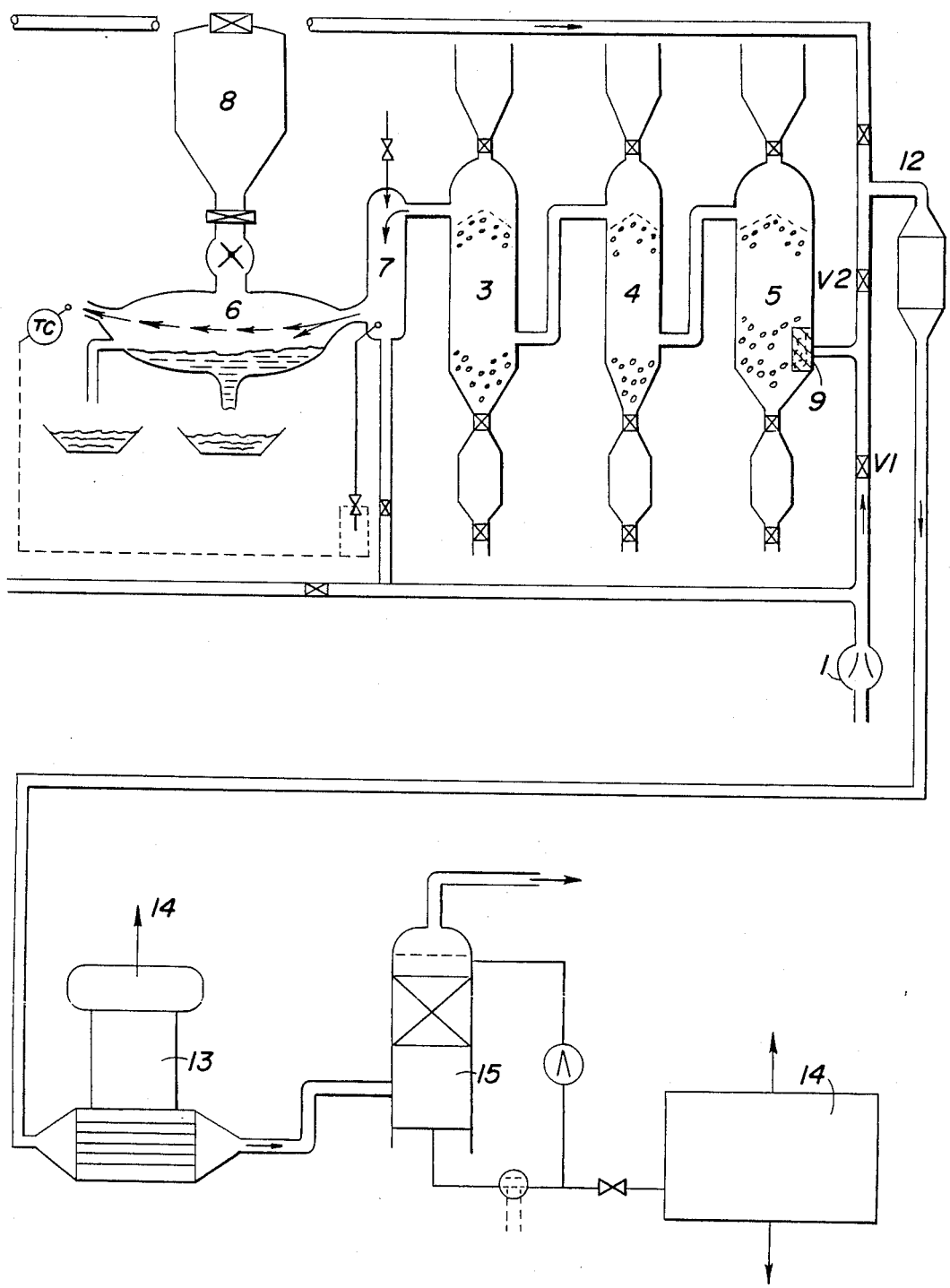
FIG. 2 is a similar flow diagram in which the sections of the regenerators are divided into individual units and additional stages for treating flue gases are connected.

Referring to the drawings in particular, the method of the invention employs an arrangement with a melting vessel 6 connected at a first side to combustion chamber 7 and regenerator 2 and connected a second side to combustion chamber 7' and regenerator 2'. Each regenerator 2, 2' includes a thermal storage section 3, 3', a section for the adsorption of impurities contained in flue gas 4, 4' and a section for further treatment of the flue gas 5, 5'. According to a second embodiment of the invention, the regenerator may be in the form of separate stages as shown in FIG. 2 (only one side of the melting vessel is shown).

Figure 1:
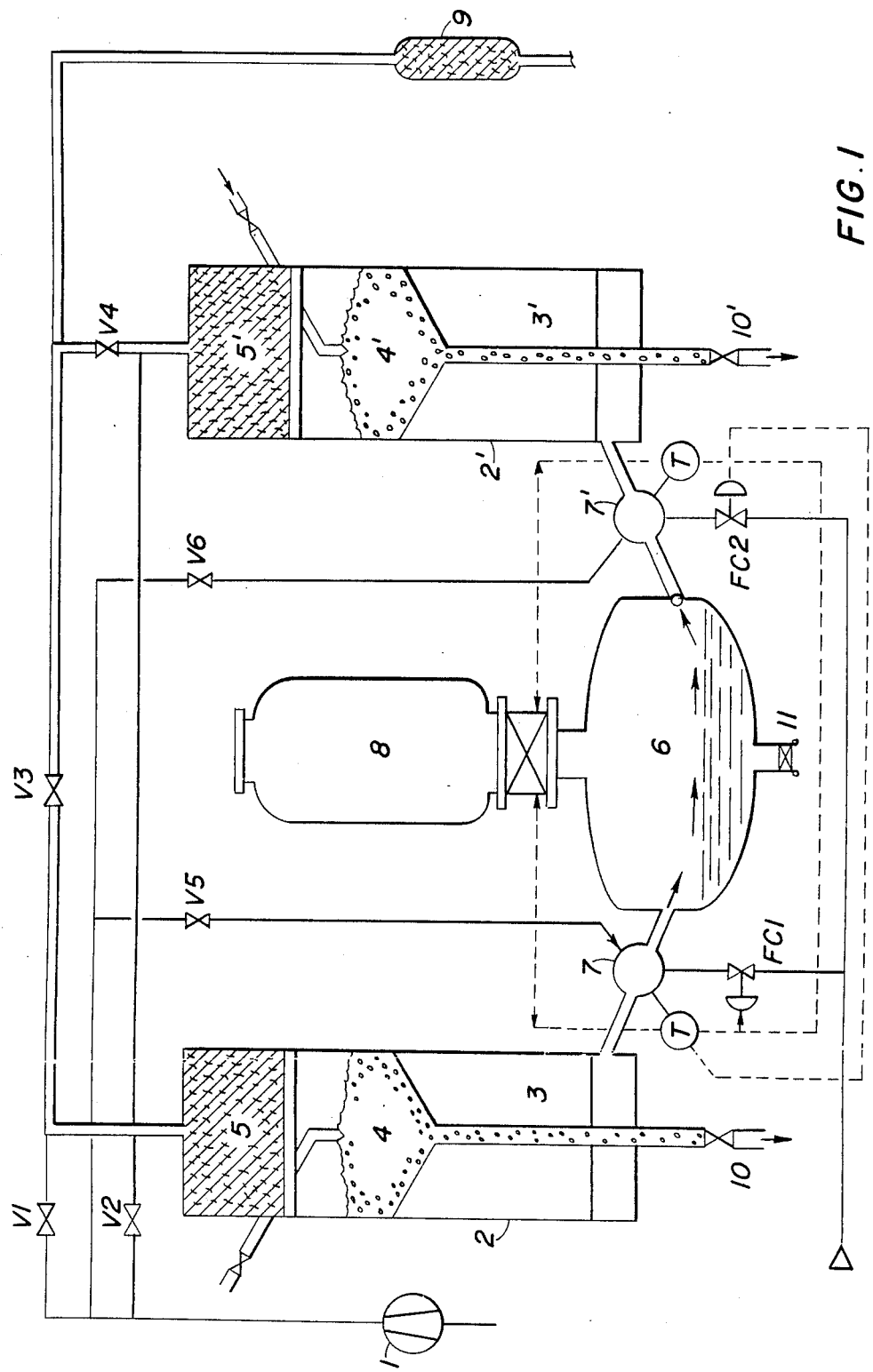
FIG. 1 is a flow diagram of the method of the invention.

The method in accordance with FIG. 1 is as follows:

Air from the blower 1 is fed to the regenerator 2 through a valve V1, while valves V2 and V3 are closed, and flows at a given exit temperature into the combustion chamber 7.

In the combustion chamber 7, fuel is fed through a control valve FC1 so that the flue gas leaving the melting vessel 6 does not vary above or below a given temperature range as measured in the combustion chamber 7'. The flue gas flowing from the combustion chamber 7' into the regenerator 2' heats the storage mass as it cools.

The regenerators 2, 2', are divided into three sections. Section 3, 3' consists of highly refractory thermal storage material, and section 4, 4', is a charge consisting of calcium compounds which can remove sulfur or organic halides, for example, from the flue gas and which can be removed from the regenerator through 10, 10'. The section 4, 4', can be so designed that entrained dust will be removed in this section.

After the flue gas passes through section 4, 4', the flue gas flows into section 5, 5', in which an additional storage of heat is possible. Section 5, 5', can be used as a filter or also as a catalyst for the degradation of toxic substances in the flue gas.

This section is provided with a known filter substance for this purpose.

The cooling in section 5, 5', can be performed such that reformation of substances in the flue gas to dioxins, for example, will not be possible.

The flue gas then flows out through an additional filter 9.

The above-described process then reverses: Valve V2 is opened, valve V4 is closed, valve V3 is opened. The flue gas flows through the combustion chamber 7' to combustion chamber 7 and through valve V3 to filter 9.

Additional control of the temperatures in the combustion chambers 7, 7', is possible through a controlled feeding of the waste per unit time from the waste hopper (container 8), e.g. through a controlled lock system at the hopper or container discharge outlet and through the addition of external air through valves V5 and V6 into the combustion chambers 7, 7'.

Incombustible wastes from the container 8 melt in the melting vessel 6 and are drawn off as molten slag through the outlet 11.

The combustion chambers 7 and 7' are configured such that, if there is unburned exhaust gas coming from the melting vessel 6, a secondary firing can be performed (they serve as afterburners).

A variant of the process represented in FIG. 1 is represented in FIG. 2 This Figure shows, in addition to the melting vessel 6 with its charger etc. and the combustion chamber, the course of the flue gas through the regenerator to the quench.

In accordance with this variant, sections 3, 3', 4, 4', 5, 5' of the regenerators 2, 2' are divided into individual units.

Furthermore, FIG. 2 shows, supplementing FIG. 1, the flue gas treatment section consisting of $NO_x$ catalyst 12, steam generator 13 for a condensation system 14, and the quench 15 for cleansing the flue gas of chlorine and fluorine compounds and from residual dusts.

While specific embodiments of the invention have been shown and described in detail to illustrate the application of the principles of the invention, it will be understood that the invention may be embodied otherwise without departing from such principles.

What is claimed is:

1. A method for thermal treatment of wastes which are combustible, poorly combustible or incombustible, especially wastes which cannot safely be dumped, comprising the steps of: preheating air to a temperature of 800° to 1200° C. in a first regenerator; feeding the preheated air to a first combustion chamber to generate heated gases; introducing wastes into a melting vessel for thermal treatment; feeding the heated gases from the first combustion chamber to the melting vessel to generate flue gas; feeding flue gas from the melting vessel to a second combustion chamber; feeding flue gas from the second combustion chamber to a second regenerator; providing each of the first and second regenerators with a section for thermal storage, a section for absorption of impurities contained in the flue gas, and a section for further treatment of the flue gas; and passing the flue gas through the section for thermal storage, the section for adsorption of impurities contained in the flue gas, and the section for further treatment of the flue gas, of the second regenerator.

2. A method according to claim 1, further comprising the steps of: reversing the direction of air feed and flue gas feed, including preheating air in the second regenerator, feeding the preheated air to the second combustion chamber to generate heated gases, feeding the generated gases from the second combustion chamber to the melting vessel to generate flue gas and feeding the flue gas to the first regenerator through the first combustion chamber.

3. A method according to claim 1 wherein the temperature of air/gas entering the melting vessel is controlled by feeding one of the combustion chambers with air to control the temperature of the air and of the flue gas entering the melting vessel in a bypass to a particular regenerator.

4. A method according to claim 1, wherein the temperature of the flue gas entering one of said first or second regenerators is regulated by introducing air and/or fuel in the particular combustion chamber.

5. An apparatus for thermal treatment of wastes which are combustible, poorly combustible or incombustible, especially wastes which cannot safely be dumped, comprising: a melting vessel with a controlled waste feed and a slag outlet; first regenerator means having an air inlet and an air/gas outlet, said first regenerator means for preheating air and for cleaning flue gas from said melting vessel; second regenerator means having an air inlet and an air/gas outlet, said second regenerator means for preheating air and for cleaning flue gas from said melting vessel; a first combustion chamber connected between said first regenerator means and said melting vessel; a second combustion chamber connected between said second regenerator means and said melting vessel; connection and blower means for establishing air and flue gas flow in a first direction from said first regenerator means, through said first combustion chamber, through said melting vessel, through said second combustion chamber to said second regenerator means and for establishing air and flue gas flow in a second direction from said second regenerator means through said second combustion chamber, through said melting vessel, through said first combustion chamber to said first regenerator means; each of the first and second regenerator means being provided with a section for thermal storage, a section for adsorption of impurities contained in the flue gas, and a section for further treatment of the flue gas.

6. An apparatus according to claim 5, wherein the charging of the melting vessel (6) with wastes is performed through a container-like vessel (8) and through a controlled lock system (10).

7. An apparatus according to claim 5, wherein each of said regenerator means includes a lower section which is configured as a grid chamber, especially in fire brick work construction, a middle section situated above said grid chamber constructed as an adsorber with replaceable adsorbers, and an upper section including filter elements for the catalytic removal of $NO_x$ or other flue gas components.

8. An apparatus according to claim 7, wherein each of said sections of said regenerators are separated and provided as individual regenerator elements.

9. An apparatus according to claim 5, wherein one of said regenerators is connected to steam generation means, means for flue gas purification of chlorine and fluorine compounds, means for removal of residual dusts and means for concentration of flue gas by evaporation.

10. A method for thermal treatment of wastes which are combustible, poorly combustible or incombustible, especially wastes which cannot safely be dumped, comprising the steps of: preheating air to a temperature of 800° to 1200° C. in a first regenerator; feeding the preheated air to a first combustion chamber to generate heated gases; introducing wastes into a melting vessel for thermal treatment; feeding the heated gases from the first combustion chamber to the melting vessel to generate flue gas; feeding flue gas from the melting vessel to a second combustion chamber; feeding flue gas from the second combustion chamber to a second regenerator; providing each of the first and second regenerators with a section for thermal storage, a section for adsorption of impurities contained in the flue gas, and a section for further treatment of the flue gas; and passing the flue gas sequentially through the section for thermal storage, the section for adsorption of impurities contained in the flue gas, and the section for further treatment of the flue gas, of the second regenerator;

reversing the direction of air feed and flue gas feed, including preheating air in the second regenerator, feeding the preheated air to the second combustion chamber to generate heated gases, feeding the generated gases from the second combustion chamber to the melting vessel to generate flue gas and feeding the flue gas to the first regenerator through the first combustion chamber; and passing the flue gas sequentially through the section for thermal storage, the section for adsorption of impurities contained in the flue gas, and the section for further treatment of the flue gas, of the first regenerator;

while supplying fuel and air to the combustion chambers and air to be preheated to a particular regenerator as well as the waste to the melting vessel at selective flow rates sufficient to preheat to said temperature the air to be preheated in the particular regenerator and sufficient for thermal treatment of the waste being introduced into the melting vessel and for generating flue gas.

11. An apparatus for thermal treatment of wastes which are combustible, poorly combustible or incombustible, especially wastes which cannot safely be dumped, comprising: a melting vessel with a controlled waste feed and a slag outlet; first regenerator means having an air inlet and an air/gas outlet, said first regenerator means for preheating air and for cleaning flue gas from said melting vessel; second regenerator means having an air inlet and an air/gas outlet, said second regenerator means for preheating air and for cleaning flue gas from said melting vessel; a first combustion chamber connected between said first regenerator means and said melting vessel; a second combustion chamber connected between said second regenerator means and said melting vessel; connection and blower means for establishing air and flue gas flow in a first direction from said first regenerator means, through said first combustion chamber, through said melting vessel, through said second combustion chamber to said second regenerator means and for establishing air and flue gas flow in a second direction from said second regenerator means through said second combustion chamber, through said melting vessel, through said first combustion chamber to said first regenerator means; each of the first and second regenerator means being provided with a section for thermal storage, a section for adsorption of impurities contained in the flue gas, and a section for further treatment of the flue gas, said sections being in series flow arrangement with the section for thermal storage adjacent the corresponding combustion chamber.

* * * * *